(12) United States Patent
Harper

(10) Patent No.: US 10,663,026 B2
(45) Date of Patent: May 26, 2020

(54) BELLEVILLE WASHER AND BELLEVILLE SPRING

(71) Applicant: Check-Mate Industries, Inc., West Babylon, NY (US)

(72) Inventor: Robert William Harper, West Babylon, NY (US)

(73) Assignee: Check-Mate Industries, Inc., West Babylon, NY (US)

( * ) Notice: Subject to any disclaimer, the term of this patent is extended or adjusted under 35 U.S.C. 154(b) by 43 days.

(21) Appl. No.: 16/150,598

(22) Filed: Oct. 3, 2018

(65) Prior Publication Data

US 2020/0109756 A1   Apr. 9, 2020

(51) Int. Cl.
F16F 1/32 (2006.01)
F16F 3/02 (2006.01)

(52) U.S. Cl.
CPC ............... *F16F 1/32* (2013.01); *F16F 3/023* (2013.01)

(58) Field of Classification Search
CPC .... F16F 1/32; F16F 1/322; F16F 1/328; F16F 1/326; F16F 1/324; F16F 3/023

USPC ................... 267/158, 159, 160–162
See application file for complete search history.

(56) References Cited

U.S. PATENT DOCUMENTS

| | | | |
|---|---|---|---|
| 9,003,661 B2* | 4/2015 | Terada | B21D 28/06 192/48.1 |
| 9,964,158 B2* | 5/2018 | Kubota | F16F 15/134 |
| 2018/0042442 A1* | 2/2018 | Metzel | A47L 13/255 |

FOREIGN PATENT DOCUMENTS

| | | | |
|---|---|---|---|
| CN | 202719061 U | * | 2/2013 |
| CN | 204458952 U | * | 7/2015 |
| CN | 107420471 A | * | 12/2017 |

* cited by examiner

*Primary Examiner* — Pamela Rodriguez
(74) *Attorney, Agent, or Firm* — Abelman, Frayne & Schwab

(57) ABSTRACT

A Belleville washer with interlocking teeth to allow one washer to firmly lock to an adjacent washer, positioned in series, allowing for assembly of a modular-type stackable spring, without need of a bolt for retention of washer alignment.

11 Claims, 4 Drawing Sheets

BELLEVILLE WASHER AND BELLEVILLE SPRING

FIELD OF THE INVENTION

This invention relates to a Belleville washer and Belleville spring to be used in place of a helical compression spring that compresses and pushes back on an applied force or load, and that returns to its original position when the force or load is removed.

BACKGROUND OF THE INVENTION

Compression coil springs made of a spiral of material, typically steel, are very commonly used for applications requiring resistance to compressive forces. The life of coil springs is highly variable. They can deteriorate from use, as well as from external factors such as corrosion, or erosion from dust and debris. In some applications, coil springs are constantly being loaded and unloaded, while in other applications the coil springs may remain loaded for long periods of time, including months or years.

For example, one common application for a coil spring is in a magazine for a firearm. A magazine can be fixed within a firearm or removable from the firearm, depending upon the firearm design. A user inserts cartridges into the magazine against the resistance of the spring. If the spring wears out or fails, the firearm may not cycle properly. If a firearm magazine, and thus the spring within it, is continually loaded and unloaded, the spring will weaken, but at least then the user will be able to discern that the spring is weakening because the magazine will become easier to load. In contrast, if a firearm magazine is left loaded for months or years, the user may not realize that the spring has weakened to the point that the operation of the firearm will be compromised. To address this concern, standard law enforcement practice is to rotate magazines every three months. Therefore, there is a need for a spring design that offers better performance, higher reliability, and greater longevity than a coil spring.

One alternative to the coil spring is the Belleville washer, which is also known as a coned-disc spring, conical spring washer, disc spring, or cupped spring washer. A Belleville washer is a washer that is pre-loaded into a frustoconical shape, providing it with the characteristic of a spring. An example of this washer is shown in FIG. 1A. A popular option, shown in profile in FIG. 1B, is for the central hole of the washer to be surrounded by a flat surface known as a contact flat, with the remaining part of the washer having a frustoconical shape. Other shapes are possible. The Belleville washer gets its name from Julien Belleville, who in 1867 patented a spring in the shape of a frustoconical washer.

The Belleville washer, which is preloaded along the axis parallel to its thickness, has a number of advantages. It can support very large loads with a small installation space. Force transmission is absolutely concentric. Varying the height/thickness ratio can produce a wide variety of load deflection curves.

While a single Belleville washer can be used as a spring, and some may use the alternate name Belleville spring to refer to a single Belleville washer, it is also known in the art that a spring can also be formed from a number of the washers that are stacked. In a parallel stack, the stack has the washers oriented in the same direction, so that the convex side of one washer faces the concave side of the adjacent washer, as shown in FIG. 1C. In a series stack, the stack has the washers oriented in an alternate direction, so that the convex side of one washer faces the convex side of the adjacent washer, as shown in FIG. 1D, or so that the concave side of one washer faces the concave side of the adjacent washer, as shown in FIG. 1E. A stack can also include both parallel and series washers, i.e., some washers oriented in the same direction and other washers oriented in alternate directions, as shown in FIG. 1F.

In this application, we will refer to a single disc as a Belleville washer, and will reserve the term Belleville spring to refer specifically to a stacked plurality of the discs.

A stack of Belleville washers can contain a number of identical washers, or can contain Belleville washers that vary in their height, thickness, size, and so forth. When a stack of Belleville washers is properly designed, a large damping effect can be achieved.

The spring rate, also known as spring constant (k), is the constant amount of force or spring rate of force it takes an extension or compression spring to travel an inch of distance or, in the metric system of measurement, a millimeter of distance. In a coil spring, the compressed preload tension (pL) is the compression distance (T) times the spring constant (k), also known as spring rate, which yields a very high spring tension curve. When coil springs combined in parallel, the effective spring constant of the combination is the sum of the individual spring constants. The results in a softer joint, requiring a lesser force to achieve a given amount of deflection. When coil springs are combined in series, the inverse of the effective spring constant of the combination is the sum of the inverses of the individual spring constants. This creates a stiffer joint, requiring a greater force to achieve a given amount of deflection.

How Belleville washers are stacked similarly modifies the spring constant of the stack. Stacking Belleville washers in the same direction is equivalent to combining coil springs in parallel: the effective spring constant of the combination is the sum of the individual spring constants. This creates a stiffer joint, requiring a greater force to achieve a given amount of deflection. Stacking Belleville washers in alternate directions is equivalent to combining coil springs in series: the inverse of the effective spring constant of the combination is the sum of the inverses of the individual spring constants. The results in a softer joint, requiring a lesser force to achieve a given amount of deflection. Mixing and matching directions allow a specific spring constant and deflection capacity to be designed.

Generally, if n Belleville washers are stacked in parallel (facing the same direction), the deflection of the whole stack is equal to that of one Belleville washer divided by n, then, to obtain the same deflection of a single Belleville washer the load to apply has to be n times that of a single Belleville washer. On the other hand, if n Belleville washers are stacked in series (facing in alternating directions), the deflection is equal to n times that of one Belleville washers while the load to apply at the whole stack to obtain the same deflection of one Belleville washer can be that of a single Belleville washer divided by n.

There are many other applications in which a coil spring can be replaced by one or more Belleville washers. In the prior art, Belleville washers are provided with a central hole through which a bolt is passed, as shown in FIG. 1A. The bolt maintains the Belleville washer or washers in position. When a number of Belleville washers are combined in series, in parallel, or in a combination of series and parallel, the bolt maintains the Belleville washers in alignment with each other.

What is required is a Belleville washer that can be combined in series with Belleville washers of identical or similar design, while retaining their alignment, without recourse to using a bolt. In this invention, a Belleville washer uses interlocking teeth to allow one washer to firmly lock to an adjacent washer, allowing for assembly of a modular-type stackable spring.

In a preferred embodiment, the Belleville washer deviates from the traditional frustoconical shape, and instead is shaped as an elliptic paraboloid or the frustum of a pyramid with a curved rectangular base.

Each Belleville disc of the invention can vary in size, cross section, thickness, and material so as to build a configurable type spring collection that varies whatever tensions and shapes are required. In a preferred embodiment, a Belleville spring assembled from a plurality of the Belleville washers of this invention is used in lieu of a compression coil spring, for example in firearm magazines.

SUMMARY OF THE INVENTION

The present invention provides a substantial improvement in the design of a Belleville washer. It incorporates within a Belleville washer a number of teeth, allowing each Belleville washer to lock to an adjacent Belleville washer of identical design, or of a design that is similar but that may vary, for example, in size, cross section, thickness, or material.

One advantage of the new design is that a Belleville spring, i.e., a stack of Belleville washers, can be created without the need to insert a bolt through the central holes of the Belleville washers in order to maintain their positions relative to each other. The absence of the bolt, in turn, allows such a Belleville spring to float freely within a cavity if so desired, such as a compression coil spring. Another advantage of not requiring a bolt to maintain a stack of Belleville washers in position relative to each other is that the shape of the Belleville washers can be changed from a frustoconical shape, which has a round central hole for accepting a bolt, to having a hole with any symmetrical shape, such as, but not limited to, a circle, a square, a rectangle, or an oval.

A Belleville washer of the new design can be assembled into a Belleville spring, i.e., a stack of Belleville washers, either by a manufacturer, or by an end-user.

The Belleville washer and Belleville spring configured and arranged as described will provide improved functionality.

BRIEF DESCRIPTION OF THE DRAWINGS

Preferred embodiments of the invention are described herein below with reference to the drawings wherein.

DETAILED DESCRIPTION OF THE INVENTION

One embodiment of the present invention is directed towards a Belleville washer incorporating a number of teeth, allowing each Belleville washer to lock to an adjacent Belleville washer of identical design, or of a design that is similar but that may vary, for example, in size, cross section, thickness, or material.

Figure 1A:
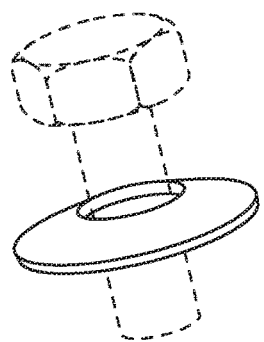
FIG. 1A shows a perspective view of a prior art Belleville washer of a frustoconical shape, with a bolt placed through its central hole.
Figure 1B:
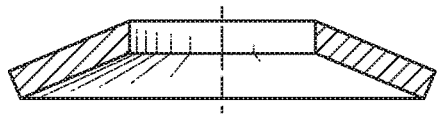
FIG. 1B shows a sectional view of a prior art Belleville washer with a contact flat.
Figure 1C:
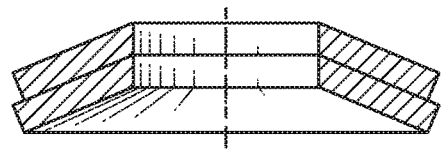
FIG. 1C shows a sectional view of a parallel stack of two prior art Belleville washers.
Figure 1D:
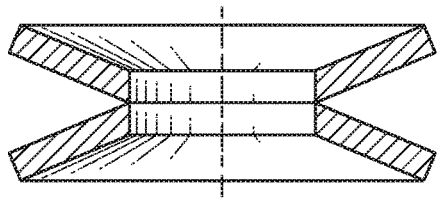
FIG. 1D shows a sectional view of a series stack of two prior art Belleville washers.
Figure 1E:
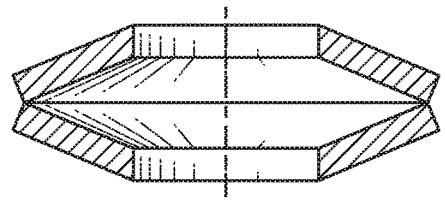
FIG. 1E shows a sectional view of a series stack of two prior art Belleville washers.
Figure 1F:
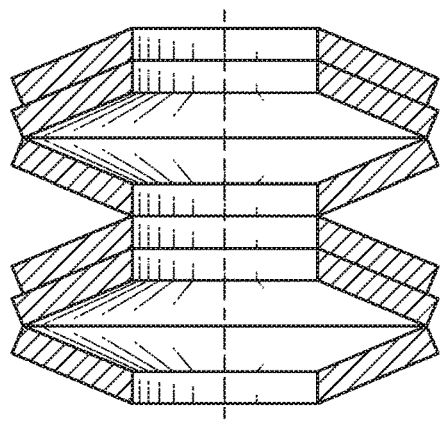
FIG. 1F shows a sectional view of a parallel and series stack of prior art Belleville washers.
Figure 2:
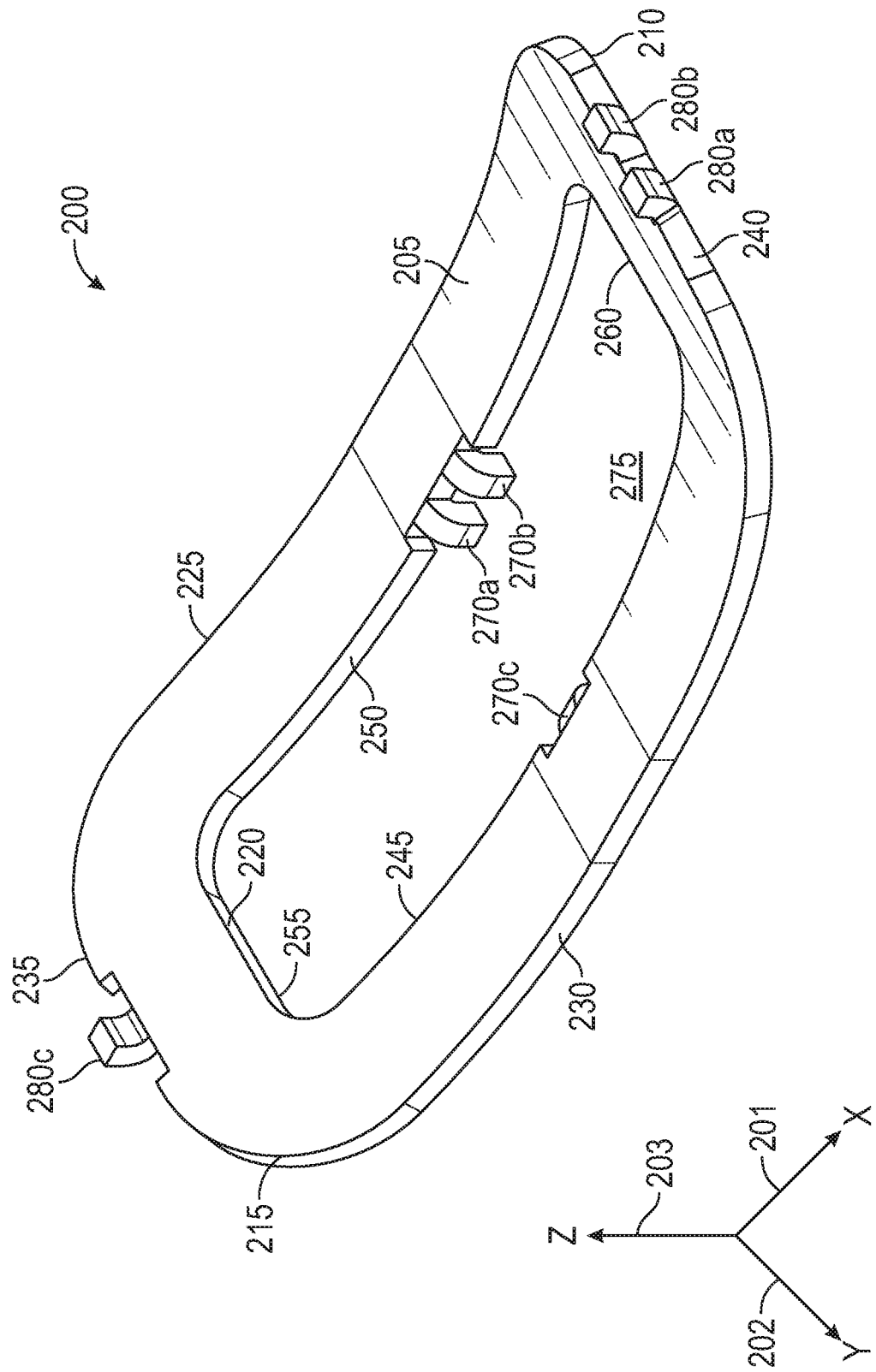
FIG. 2 shows a perspective view of one embodiment of the Belleville washer of this invention.
Figure 3:
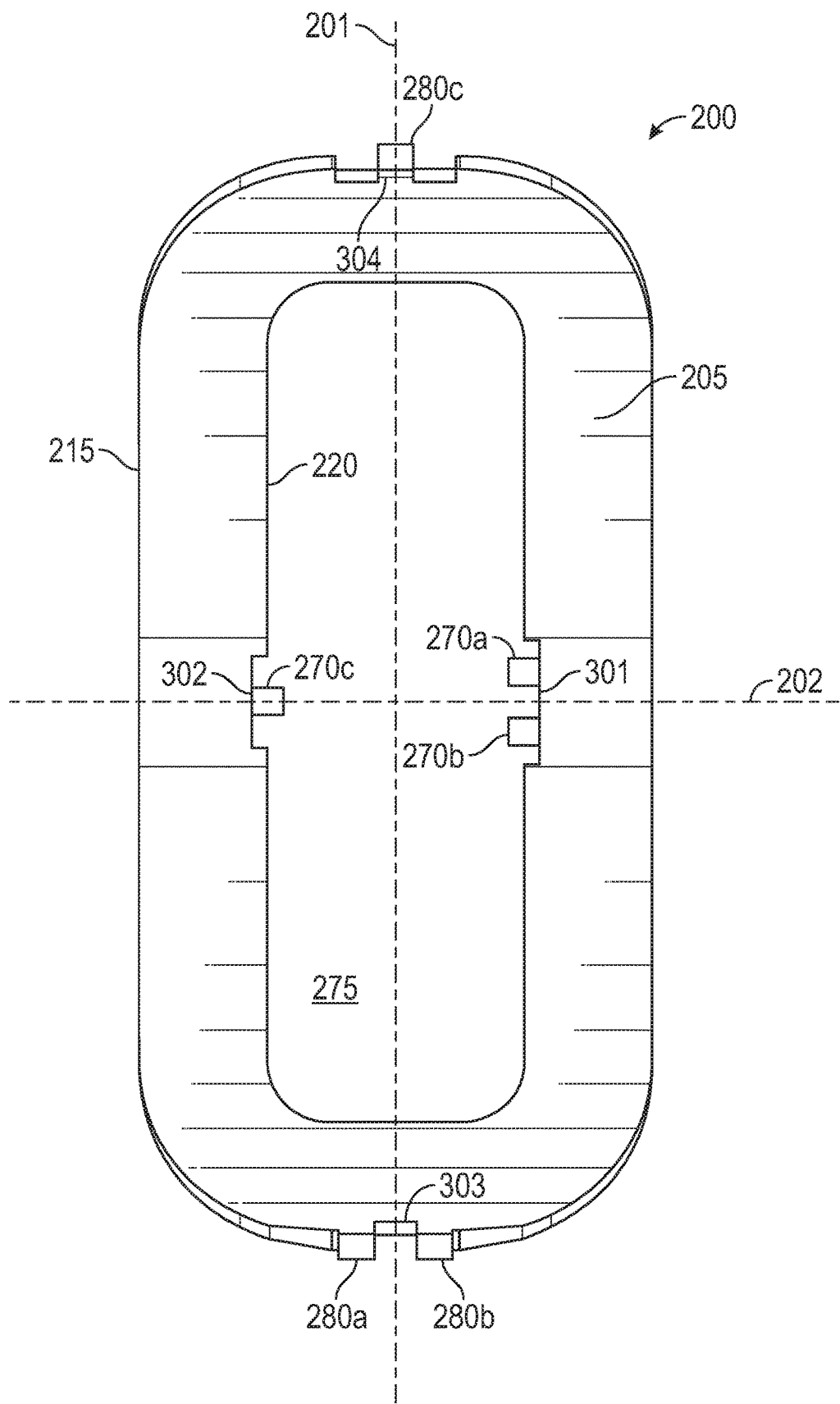
FIG. 3 shows a plan view of a top surface of the Belleville washer of this invention.

FIGS. 2 and 3 show a perspective view of Belleville washer 200, which has a curved profile, with concave surface 205 and a convex surface 210. Concave surface 205 and convex surface 210 have an average length in the X-axis 201 and an average width in the Y-axis 202. Belleville washer 200 is preloaded, i.e., given an internal load along the Z-axis 203 that is independent of any working load, as reflected by the curved profile. A narrow thickness in the Z-axis 203 separates concave surface 205 from convex surface 210 and forms an outer wall 215.

A hole 275 passes through from the concave surface 205 to the convex surface 210, forming an inner wall 220. Concave surface 205, convex surface 210, and hole 275 are symmetric along both X-axis 201 and Y-axis 202.

One set of three interlocking inner teeth 270a, 270b, and 270c are provided on the inner wall 220. Inner teeth 270a and 270b project from a first location 301 of the inner wall 220, and inner tooth 270c projects from the opposite side of inner wall 220 at a second location 302. In a preferred embodiment as shown, inner teeth 270a, 270b, and 270c extend inwardly from the wall of inner wall 220, then curve and extend in the convex direction, extending beyond convex surface 210. Inner teeth 270a and 270b are spaced apart such that when an identical or similar Belleville washer 200 is placed adjoining the first, in a series stack with convex side facing convex side, inner tooth 270c of the second washer will fit into the spacing between inner teeth 270a and 270b of the first washer, locking the two washers together. While in a preferred embodiment there are three interlocking inner teeth, one of ordinary skill in the art would understand that four or more inner teeth could be used.

A second set of three interlocking outer teeth, 280a, 280b, and 280c are provided on the outer wall 215. Outer teeth 280a and 280b project from a third location 303 of the outer wall 215, and outer tooth 280c projects from the opposite side of outer wall 215 at a fourth location 304. In a preferred embodiment as shown, outer teeth 280a, 280b, and 280c extend outwardly from the wall of outer wall 215, then curve and extend in the concave direction, extending beyond concave surface 205. Outer teeth 280a and 280b are spaced apart such that when an identical or similar Belleville washer 200 is placed adjoining the first, in a series stack with concave side facing concave side, outer tooth 280c of the second washer will fit into the spacing between outer teeth 280a and 280b of the first washer, locking the two washers together. While in a preferred embodiment there are three interlocking outer teeth, one of ordinary skill in the art would understand that four or more teeth could be used.

In the embodiment shown in FIG. 2, Belleville washer 200 is shown to have inner and outer walls in the shape of a curved rectangle, so that Belleville washer 200 can be said to be shaped as an elliptic paraboloid or as a frustum of a pyramid with a curved rectangular base. In this configuration, Belleville washer 200 has long external walls 225, 230, short external walls 235, 240, long internal walls 245, 250, and short internal walls 255, 260. As discussed, various shapes are possible besides the curved rectangular shape, including the traditional round shape.

Belleville washer 200 can be made from a variety of materials. Metallic options include low-carbon sheet steel, stainless steel, aluminum, brass, and copper. Non-metallic materials include ABS, acetal, polyester, nylon, MD nylon, polycarbonate, fiber, polyethylene and various phenolics. Washer length and width can range from ⅛ inch to 3 inches or larger, and washer thickness can range from 0.01 inch to 0.25 inches or larger.

Figure 4:
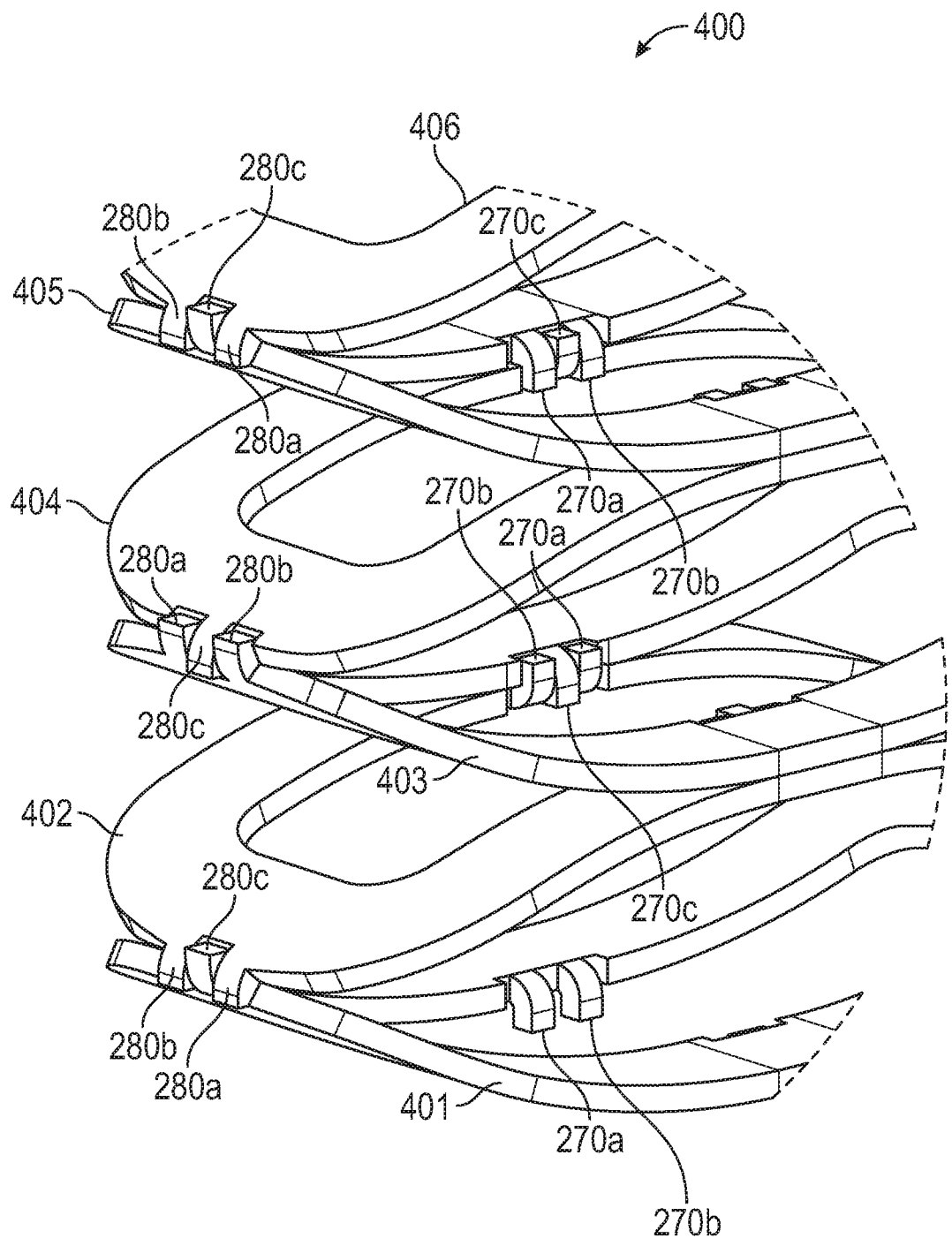
FIG. 4 shows a detail of a perspective view of a Belleville spring of this invention showing an assembly of six of the Belleville washers of this invention.

Another embodiment of this invention is a Belleville spring 400 assembled from a series stack of a plurality of Belleville washers 200 discussed above. FIG. 4 shows a detail of such a Belleville spring 400, showing parts of six Belleville washers 401-406 arranged in series. Thus, the concave side of washer 401 faces the concave side of washer 402, the washers being linked together by outer teeth 280a-c. The convex side of washer 402 faces the convex side of washer 403, the washers being linked together by inner teeth 270a-c. The concave side of washer 403 faces the concave side of washer 404, the washers being linked together by outer teeth 280a-c. The convex side of washer 404 faces the convex side of washer 405, the washers being linked together by inner teeth 270a-c. The concave side of washer 405 faces the concave side of washer 406, the washers being linked together by outer teeth 280a-c.

While preferred embodiments of the present invention have been illustrated and described herein, it will be apparent that such embodiments are provided by way of example only. Numerous variations, changes and substitutions will be apparent to those skilled in the art without departing from the invention, the scope of which is to be determined by the following claims.

The invention claimed is:

1. A Belleville washer with a concave surface (205), a convex surface (210), and a narrow thickness separating the concave surface (205) from the convex surface (210) and forming an outer wall (215), wherein the concave surface (205) and the convex surface (210) are symmetrical along both an X axis (201) and a Y-axis (202), wherein the Belleville washer is preloaded with an internal load along a Z-axis (203), wherein a hole (275) passes from the center of the concave surface (205) through to the center of the convex surface (210), forming an inner wall (220), wherein there is a set of $n_1$ outer teeth (280a-c), $n_1$ being a minimum of three, at least $n_1-1$ outer teeth (280a,b) projecting from a first location (301) on the outer wall (215), the $n_1-1$ outer teeth (280a,b) being spaced apart by a width of one of the $n_1$ outer teeth (280a-c), and the remaining $n_1$ outer teeth (280c) projecting from a second location (302) on the outer wall (215), the $n_1$ outer teeth (280a-c) at both the first and second locations (301, 302) extending outwardly and then turning toward and extending beyond the concave surface (205), the X-axis (201) bisecting the spacing between two of the $n_1-1$ (280a,b) outer teeth at the first location (301), and bisecting one of the remaining outer teeth (280c) at the second location (302), wherein there is a set of $n_2$ inner teeth (270a-c), $n_2$ being a minimum of three, at least $n_2-1$ inner teeth (270a,b) projecting from a third location (303) on the inner wall (220), the $n_2-1$ inner teeth (270a,b) being spaced apart by a width of one of the $n_2$ inner teeth (270a-c), and the remaining $n_2$ inner teeth (270c) projecting from a fourth location (304) on the inner wall (220), the $n_2$ inner teeth (270a-c) at both the third and fourth locations (303, 304) extending inwardly and then turning toward and extending beyond the convex surface (210), the Y-axis (202) bisecting the spacing between two of the $n_2-1$ inner teeth (270a,b) at the third location (303), and bisecting one of the remaining inner teeth (270c) at the fourth location (304).

2. The Belleville washer of claim 1, wherein $n_1$ is three.

3. The Belleville washer of claim 1, wherein $n_2$ is three.

4. The Belleville washer of claim 1, wherein $n_1$ and $n_2$ are both three.

5. The Belleville washer of claim 1, wherein the washer is made of steel.

6. The Belleville washer of claim 1, wherein the washer has a frustoconical shape.

7. The Belleville washer of claim 1, wherein the washer has an elliptic paraboloid shape.

8. The Belleville washer of claim 1, wherein the washer is shaped as a frustum of a pyramid with a curved rectangular base.

9. The Belleville washer of claim 1, wherein the washer is shaped as a frustum of a pyramid with a rectangular base.

10. The Belleville washer of claim 1, wherein the washer is shaped as a frustum of a pyramid with a square base.

11. A Belleville spring assembled from a plurality the Belleville washers of claim 1.

* * * * *